United States Patent
Sjöberg et al.

(10) Patent No.: US 12,267,516 B2
(45) Date of Patent: *Apr. 1, 2025

(54) METHODS OF REFERENCE PICTURE INDICATION FOR VIDEO CODING AND RELATED APPARATUSES

(71) Applicant: Telefonaktiebolaget LM Ericsson (publ), Stockholm (SE)

(72) Inventors: Rickard Sjöberg, Stockholm (SE); Mitra Damghanian, Upplands-Bro (SE); Martin Pettersson, Vallentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/227,430

(22) Filed: Jul. 28, 2023

(65) Prior Publication Data
US 2023/0370627 A1 Nov. 16, 2023

Related U.S. Application Data

(63) Continuation of application No. 17/279,183, filed as application No. PCT/EP2019/076215 on Sep. 27, 2019, now Pat. No. 11,770,547.
(Continued)

(51) Int. Cl.
*H04N 19/44* (2014.01)
*H04N 19/105* (2014.01)
(Continued)

(52) U.S. Cl.
CPC ........... *H04N 19/44* (2014.11); *H04N 19/105* (2014.11); *H04N 19/172* (2014.11); *H04N 19/1887* (2014.11); *H04N 19/46* (2014.11)

(58) Field of Classification Search
None
See application file for complete search history.

(56) References Cited

U.S. PATENT DOCUMENTS 11,770,547 B2 * 9/2023 Sjoberg .................. H04N 19/58
375/240.25

OTHER PUBLICATIONS

ITU-T "High efficiency video coding," H.265 (Feb. 2018), Series H: Audiovisual and Multilmedia Systems—Infrastructure of audiovisual services—Coding of moving video, Recommendation ITU-T H.265, Feb. 2018, 691 pages. (Year: 2018).*
(Continued)

*Primary Examiner* — Kaitlin A Retallick
(74) *Attorney, Agent, or Firm* — Sage Patent Group

(57) ABSTRACT

A method decodes one or more code words in a loop that is run N times by decoding an indication of whether a picture is a long-term picture or not and deriving a positive integer K[i]>0 for each long-term picture. An indicator value V[i] is derived for each long-term picture by subtracting the value of the positive integer K[i] from a picture indicator value P of the current picture. For each of the indicator values V[i], the indicator value V[i] is compared with values associated with pictures stored in the DPB. The method keeps the pictures stored in the DPB marked as short-term or long-term for which there is a match with one of the indicator values V[i] in the DPB as long-term pictures, and marks long-term pictures for which there is no match with any indicator value V[i] as unused for reference in the DPB.

23 Claims, 4 Drawing Sheets

Related U.S. Application Data

(60) Provisional application No. 62/739,939, filed on Oct. 2, 2018.

(51) Int. Cl.
*H04N 19/169* (2014.01)
*H04N 19/172* (2014.01)
*H04N 19/46* (2014.01)

(56) References Cited

OTHER PUBLICATIONS

Bross et al., "WD5: Working Draft 5 of High Efficiency Video Coding," (HEVC) text specification, Document: JCTVC-G1103_d9, Joint Collaborative Team on Video Coding (JCT-VC) of ITU-T SG16 WP3 and ISO/IEC JTC1/SC29/WG11, 9th Meeting: Geneva; CH Nov. 21-30, 2011, 225 pages. (Year: 2011).*

International Search Report and Written Opinion of the International Searching Authority for PCT International Application No. PCT/EP2019/076215 dated Jan. 2, 2020.

ITU-T "High efficiency video coding," H.265 (Feb. 2018), Series H: Audiovisual and Multimedia Systems—Infrastructure of audiovisual services—Coding of moving video, Recommendation ITU-T H.265, Feb. 2018, 691 pages.

Bross et al., "WD5: Working Draft 5 of High Efficiency Video Coding," (HEVC) text specification, Document: JCTVC- G1103_d9, Joint Collaborative Team on Video Coding (JCT-VC) of ITU-T SG16 WP3 and ISO/IEC JTC1/ SC29/WG11, 9th Meeting: Geneva; CH Nov. 21-30, 2011, 225 pages.

Sjoberg (Ericsson) R et al: "Simplified RPS for VVC", JVET Meeting; Oct. 3, 2018-Oct. 12, 2018; Macao; (The Joint Video Exploration Team of ISO/IEC JTC1/SC29/WG11 and ITU-T SG.16) No. JVET-L0416, Oct. 3, 2018, 8 pages (*part of ITU-T "High efficiency video coding," H.265 (Feb. 2018), Series H: Audiovisual and Multimedia Systems—Infrastructure of audiovisual services— Coding of moving video, Recommendation ITU-T H.265).

Hendry et al., "AHG15: Signalling Long-term Reference Picture Set", Document: JCTVC-I0076, Joint Collaborative Team on Video Coding (JCT-VC) of ITU-T SG 16 WP 3 and ISO/IEC JTC 1/SC 29/WG 11, 9th Meeting: Geneva; CH Apr. 27- May 7, 2012, 8 pages.

* cited by examiner

METHODS OF REFERENCE PICTURE INDICATION FOR VIDEO CODING AND RELATED APPARATUSES

CROSS REFERENCE TO RELATED APPLICATIONS

This application is a continuation of U.S. patent application Ser. No. 17/279,183 filed on Mar. 24, 2021, which is a 35 U.S.C. § 371 national stage application of PCT International Application No. PCT/EP2019/076215 filed on Sep. 27, 2019, which claims the benefit of U.S. Provisional Patent Application Ser. No. 62/739,939, filed on Oct. 2, 2018, the disclosures and content of which are incorporated by reference herein in their entireties.

BACKGROUND

The present disclosure relates generally to video picture coding, and more particularly, to decoding a picture from a bitstream.

High Efficiency Video Coding (HEVC) is a block-based video codec standardized by ITU-T and MPEG. HEVC is a hybrid codec that uses multiple reference pictures for inter prediction. HEVC includes a picture marking process in which reference pictures can be marked as "used for short-term reference", "used for long-term reference" and "unused for reference". If marked "unused for reference", the picture cannot be used for Inter prediction any more. The marking process in HEVC is controlled by reference picture sets. A reference picture set (RPS) is a set of picture identifiers that identifies reference pictures. The set is sent in each slice and reference pictures that are indicated will be kept in the decoded picture buffer (DPB) if they are present in the set (and present in the DPB). If a picture is kept in the DPB it could be used to decode the current picture. It may also be stored for decoding future pictures. If a picture is not kept it may be flushed from the DPB.

The RPS part of the slice segment header syntax is shown in Table 1.

Pictures in HEVC are identified by their picture order count (POC) values, also known as full POC values. Each slice contains a code word, pic_order_cnt_lsb, that shall be the same for all slices in a picture. pic_order_cnt_lsb is also known as the least significant bits (lsb) of the full POC since it is a fixed-length code word and only the least significant bits of the full POC is signaled. Both encoder and decoder keep track of POC and assign POC values to each picture that is encoded/decoded. The pic_order_cnt_lsb can be signaled by 4-16 bits. There is a variable MaxPicOrderCntLsb used in HEVC which is set to the maximum pic_order_cnt_lsb value plus 1. This means that if 8 bits are used to signal pic_order_cnt_lsb, the maximum value is 255 and MaxPicOrderCntLsb is set to $2^8=256$. The picture order count value of a picture is called PicOrderCntVal in HEVC. Usually, PicOrderCntVal for the current picture is simply called PicOrderCntVal.

Short-term pictures are indicated in the RPS through a pair of numbers, the POC of the reference picture and a flag: used_by_curr_pic_sx_flag. The decoder knows the POC of the reference pictures in the DPB and can match those against the POC values received in the RPS. The flag used_by_curr_pic_sx_flag indicates whether the reference picture is used for reference for the current picture or not. The x in used_by_curr_pic_sx_flag is either 0 or 1, where 0 indicates that the POC value for the reference picture is less than that of the current picture and 1 indicates that the POC value for the reference picture is greater than that of the current picture. Long-term pictures are generally indicated in the RPS by the least significant bit (lsb) part of the POC value of the reference picture. However, the HEVC standard has an optional code word, delta_poc_msb_cycle_lt_minus1, which provides an alternative way of referencing long-term pictures. The long-term picture part of the HEVC slice header syntax is also shown in Table 1.

TABLE 1

| RPS slice header syntax | Descriptor |
|---|---|
| slice_segment_header( ) { | |
| ... | |
|   if( nal_unit_type != IDR_W_RADL && nal_unit_type != IDR_N_LP ) { | |
|     slice_pic_order_cnt_lsb | u(v) |
|     short_term_ref_pic_set_sps_flag | u(1) |
|     if( !short_term_ref_pic_set_sps_flag ) | |
|       st_ref_pic_set( num_short_term_ref_pic_sets ) | |
|     else if( num_short_term_ref_pic_sets > 1) | |
|       short_term_ref_pic_set_idx | u(v) |
|     if( long_term_ref_pics_present_flag ) { | |
|       if( num_long_term_ref_pics_sps > 0) | |
|         num_long_term_sps | ue(v) |
|       num_long_term_pics | ue(v) |
|       for( i= 0; i < num_long_term_sps + num_long_term_pics; i++ ) { | |
|         if( i < num_long_term_sps ) { | |
|           if( num_long_term_ref_pics_sps > 1) | |
|             lt_idx_sps[ i ] | u(v) |
|         } else { | |
|           poc_lsb_lt[ i ] | u(v) |
|           used_by_curr_pic_lt_flag[ i ] | u(1) |
|         } | |
|         delta_poc_msb_present_flag[ i ] | u(1) |
|         if( delta_poc_msb_present_flag[ i ] ) | |
|           delta_poc_msb_cycle_lt[ i ] | ue(v) |
|       } | |
|     } | |
| ... | | delta_poc_msb_present_flag specifies if the long-term picture is indicated by the lsb part of its POC or the full POC. If delta_poc_msb_present_flag is equal to 0, the long-term picture is indicated by the lsb part of its POC. If delta_poc_msb_present_flag is equal to 1, the long-term picture is indicated by the full POC, i.e. the lsb part of POC and a POC msb cycle used to calculate the msb part of POC. delta_poc_msb_present_flag equal to 1 allows for two long-term pictures to share the same POC lsb. The HEVC standard currently mandates that delta_poc_msb_present_flag shall be equal to 1 when there is risk that the decoder can't identify pictures correctly due to multiple pictures in the DPB sharing the same POC lsb.

The risk of multiple pictures in DPB sharing the same POC lsb is restricted by the following text in the HEVC specification:

"Let prevTid0Pic be the previous picture in decoding order that has TemporalId equal to 0 and is not a RASL, RADL or SLNR picture. Let setOfPrevPocVals be a set consisting of the following:

the PicOrderCntVal of prevTid0Pic, the PicOrderCnt Val of each picture in the RPS of prevTid0Pic, the PicOrderCnt Val of each picture that follows prevTid0Pic in decoding order and precedes the current picture in decoding order.

When there is more than one value in setOfPrevPocVals for which the value modulo MaxPicOrderCntLsb is equal to PocLsbLt[i], delta_poc_msb_present_flag[i] shall be equal to 1."

HEVC defines temporal sub-layers. For each picture the variable TemporalId, calculated from the syntax element nuh_temporal_id_plus1, indicates which temporal sub-layer the picture belongs to. A lower temporal sub-layer cannot depend on a higher temporal sub-layer and a sub-bitstream extraction process requires that when one or more of the highest temporal sub-layers are removed from a bitstream the remaining bitstream shall be a conforming bitstream.

The main problem with the HEVC long-term picture signaling mechanism is that it is overly complex to implement. The following explanation highlights this level of complexity.

The HEVC long-term picture signaling mechanism needs five lists to be generated where each list has detailed description and occupies extensive parts of the specification text. HEVC long-term picture signaling mechanism also requires the decoder to keep track of a lot of restrictions which adds to the size of the specification text and potentially increases the number of code lines in the HEVC implementation to take care of all the detailed aspects.

The following are some examples of the operations required in the HEVC long-term picture signaling mechanism:

a. delta_poc_msb_cycle_lt is used to determine the value of the most significant bits of the picture order count value of a long-term picture in the long-term RPS of the current picture. When delta_poc_msb_cycle_lt is not present, it is inferred to be equal to 0.

b. Delta_poc_msb_present_flag is a flag to specify if delta_poc_msb_cycle_lt is present. Delta_poc_msb_present_flag equal to 1 specifies the presence and Delta_poc_msb_present_flag equal to 0 specifies the absence of delta_poc_msb_cycle_lt.

c. DeltaPocMsbCycleLt is a per entry variable in the long-term RPS of the current picture. DeltaPocMsbCycleLt is set equal to delta_poc_msb_cycle_lt if the long-term picture is the first or the last in the long-term RPS of the current picture. Otherwise, DeltaPocMsbCycleLt is set equal to the sum of delta_poc_msb_cycle_lt of the current and previous entry in the long-term RPS of the current picture.

d. used_by_curr_pic_lt_flag equal to 0 for the i-th entry in the long-term RPS of the current picture specifies that the i-th entry is not used for reference by the current picture.

e. UsedByCurrPicLt is derived for each entry in the long-term RPS of the current picture as follows: it is set equal to used_by_curr_pic_lt_sps_flag if the number of the entry is smaller than the number of entries in the long-term RPS of the current picture. Otherwise it is set equal to used_by_curr_pic_lt_flag.

f. CurrDeltaPocMsbPresentFlag is derived for every entry in the long-term RPS of the current picture if UsedByCurrPicLt is equal to 1 for that entry. When this condition holds, CurrDeltaPocMsbPresentFlag for that entry is set equal to delta_poc_msb_present_flag of the current entry in the long-term RPS of the current picture.

g. FollDeltaPocMsbPresentFlag is derived for every entry in the long-term RPS of the current picture if UsedByCurrPicLt is equal to 0 for that entry. When this condition holds, FollDeltaPocMsbPresentFlag for that entry is set equal to delta_poc_msb_present_flag of the current entry in the long-term RPS of the current picture.

There are other operations required in the HEVC specifications involved in the HEVC long-term picture signaling mechanism that can be added to the above list, e.g., PocLtCurr and PocLtFoll.

Reconstruction of the following five lists are required in HEVC long-term picture signaling mechanism: UsedByCurrPicLt[i], PocLtCurr[i], PocLtFoll[i], PocLsbLt[i] and DeltaPocMsbCycleLt[i] where the description for some of these lists are given above as an example of the level of complexity of the picture decoder circuit operational process.

Long-term picture signaling mechanisms in HEVC require the decoder to keep track of (operationally test and react to) about 40 restrictions. These restrictions complicate the design of decoder circuit, may necessitate a corresponding high number of operations to perform the associated testing of restrictions with a corresponding increase in the necessary computational operations per decoding cycle, and result in high power consumption by the picture decoder circuit. The code required for HEVC long-term picture handling is also consequently lengthy in the current version of the HEVC reference implementation, HM 16.18.

SUMMARY

It is a general objective to reduce complexity of long-term picture handling. These and other objectives are met by embodiments as disclosed herein.

According to a first aspect of the embodiments, there is provided a method for decoding a current picture from a bitstream. The method comprises decoding one or more code words in a loop that is run N times by decoding an indication of whether a picture is a long-term picture or not and deriving a positive integer $K[i]>0$ for each long-term picture, where i is the index in the loop. Here N is the number of long-term and short-term pictures to keep in the DPB for the current picture. The method comprises deriving an indicator value V[i] for each long-term picture by subtracting the value of the positive integer K[i] from a picture indicator value P of the current picture. The method further comprises, for each of the indicator values V[i], comparing the indicator value V[i] with values associated with pictures stored in the DPB. The method further comprises keeping the pictures stored in the DPB that are marked as short-term or long-term for which there is a match with one of the indicator values V[i] in the DPB as long-term pictures. The method comprises marking long-term pictures for which there is no match with any indicator value V[i] as unused for reference in the DPB.

According to a second aspect of the embodiments, there is provided a decoder for decoding a current picture from a bitstream. The decoder comprises a processor and a memory coupled to the processor. The memory stores a decoded picture buffer, DPB, and instructions that when executed by the processor causes the processor to perform operations comprising:

decoding (202) one or more code words in a loop that is run N times by:
decoding an indication of whether a picture is a long-term picture or not; and
deriving a positive integer K[i]>0 for each long-term picture, where i is the index in the loop;
deriving an indicator value V[i] for each long-term picture by subtracting the value of the positive integer K[i] from a picture indicator value P of the current picture; and
for each of the indicator values V[i], comparing the indicator value V[i] with values associated with pictures stored in the DPB,
keeping the pictures stored in the DPB that are marked (208) as short-term or long-term for which there is a match with one of the indicator values V[i] in the DPB as long-term pictures; and
marking (208) long-term pictures for which there is no match with any indicator value V[i] as unused for reference in the DPB, wherein N is the number of long-term and short-term pictures to keep in the DPB for the current picture.

According to a third aspect of the embodiments, there is provided a computer program product comprising a non-transitory computer readable storage medium comprising computer readable program code embodied in the medium that when executed by a processor of a decoder causes the processor to perform operations according to the first aspect of the embodiments.

According to a fourth aspect of the embodiments, there is provided a user equipment, comprising the decoder according to the second aspect.

According to a fifth aspect of the embodiments, there is provided a network node comprising the decoder according to the second aspect.

One advantage of the proposed solution is a significant complexity reduction of long-term picture handling and the amount of restrictions needed.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings.

DETAILED DESCRIPTION

Figure 1:
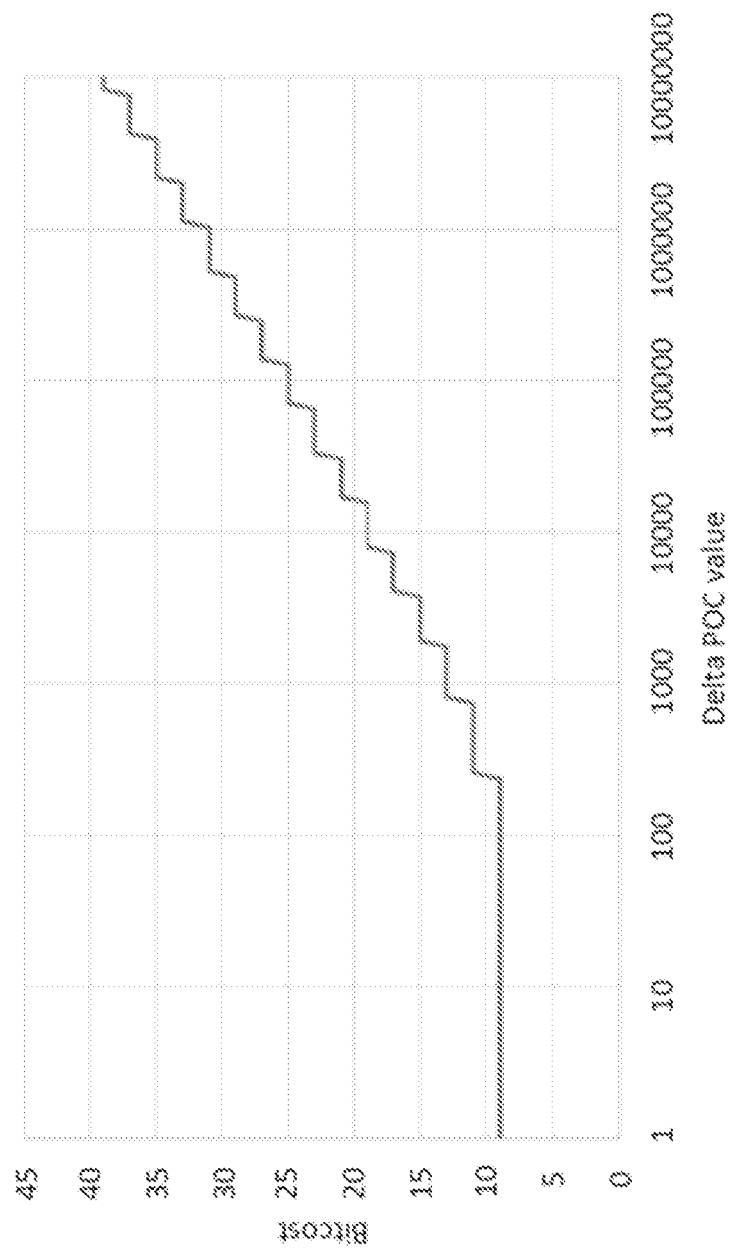
FIG. 1 is a graph that illustrates the bit cost for different delta POC values given a MaxPicOrderCntLsb equal to 256 when operating according to some embodiments.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Some embodiments of the inventive concepts include operations that always signal a delta picture indicator value for the long-term pictures that are to be kept for the current picture.

Operations according to some embodiments divide the delta picture indicator value K into two parts: a most significant bits (msb) part A; and a least significant bits (lsb) part B, where B is signaled as is using a fixed length code word of size n, and A is signaled using a variable length code.

The operations according to a further embodiment replace the following syntax elements in Table 2 with the syntax elements shown in Table 3:

TABLE 2

| Syntax elements to be replaced | |
| --- | --- |
| poc_lsb_lt[ i ] | u(v) |
| used_by_curr_pic_lt_flag[ i ] | u(1) |
| delta_poc_msb_present_flag[ i ] | u(1) |
| if( delta_poc_msb_present_flag[ i ] ) | |
| delta_poc_msb_cycle_lt[ i ] | ue(v) |

TABLE 3

| Syntax elements according to some present embodiments | |
| --- | --- |
| delta_poc_msb_lt[ i ] | ue(v) |
| delta_poc_lsb_lt[ i ] | u(v) |
| used_by_curr_pic_lt_flag[ i ] | u(1) |

In some operations according to another embodiment, short-term and long-term pictures are signaled in the same list, and an indicator is signaled for each picture whether it is a long-term picture or not.

Besides using one syntax element less and removing the "if" statement, the proposed solution significantly reduces the complexity of long-term picture handling and the amount of restrictions needed.

The specification text may be significantly reduced. About 40 restrictions may be removed if the proposed solution is used in the HEVC v5 specification implementation.

HEVC requires the reconstruction of five lists for the long-term picture signaling mechanism, UsedByCurrPicLt[i], PocLtCurr[i], PocLtFoll[i], PocLsbLt[i] and DeltaPocMsbCycleLt[i].

In one preferred solution, five list reconstructions are also required for long-term pictures, UsedByCurrPicLt[i], PocLtCurr[i], PocLtFoll[i], PocLt[i] and PocList[i], however, PocList[i] creation is simplified as it is used to specify restrictions in a more straightforward way.

In one embodiment of the invention, the number of extra lists required for long-term pictures are reduced to only one since the short-term and long-term pictures share the same lists. The additional required list would then be a list indicating whether a picture is a long-term picture, IsLtPic[i].

In this solution, the decoder stores decoded picture in a decoded picture buffer (DPB). The decoded pictures can be of type "short-term picture" and "long-term picture". The decoder receives a coded picture or part of a picture from a bitstream. The coded picture or part of a picture consists of header information and coded video data. The header consists of signaled values that control the decoder process. The coded video data consists of compressed video sample values covering the picture or part of a picture.

The header consists of control information for updating the state of the DPB. There is one or more code words specifying the number N of long-term pictures to use for the current picture. We can here assume that there are at least two long-term pictures specified, so N>1.

The decoder decodes the code word(s) from the header information and derives N. Then the decoder decodes a set of code words in a loop that it runs N times, i.e. once per long-term picture. In the loop there is at least one code word, and the decoder decodes that to derive an integer K[i] for each long-term picture, where i is the index of the loop with value in the range between 0 and N−1. In one example, N is equal to 2, and there are then two values of K; K[0] and K[1].

The decoder uses a picture indicator value P for the current picture. The picture indicator value P is derived for each decoded picture by means other than the ones described in this solution. P can be derived in many ways, but it needs to be a single integer value. For each long-term picture, a long-term picture indicator value V[i] is derived by subtracting or adding the value K[i] from the picture indicator value. Assuming in the example that the picture value of the current picture is P, we get e.g. V[0]=P−K[0] and V[1]=P−K[1] as the two long-term picture indicator values for the two long-term pictures. Optionally, V[0]=P−K[0]−1 and V[1]=P−K[1]−1.

The decoder then goes through all pictures in the DPB and those pictures in the DPB for which there is a match with any long-term picture indicator V[i] are kept in the DPB as long-term pictures. Long-term pictures for which there is no match with any long-term picture indicator are subject for removal from the DPB unless they are kept for reasons other than being used for reference for future pictures. In one embodiment, such pictures in the DPB are marked as unused for prediction.

In one embodiment, the values K[i] are derived in the decoder by decoding two code words A and B. Both are derived as integers and K[i] is derived as A[i]*x+B[i] where B[i] is signaled as-is using a fixed length code word of size n, A[i] is signaled using a variable length code, and x is equal to 2^n where ^ is the power operator. A[i] and B[i] may both be positive integers.

In another embodiment K[i] represents the delta relative to V[j] value instead of relative to the value P. In this case, the value V[0] is still set equal to P−K[0]−1 and for i>0, V[i] is set equal to V[i−1]−K[i]−1, where the −1 term is done in one variant and not done in another.

In other variants of the embodiments, the long-term picture indicators can be larger than P in addition to smaller than P. In one variant, this is done by signaling a sign flag for each value K[i], with K[i] derived as described above. In another variant, the number of long-term pictures N is split into two numbers HigherN and LowerN such that HigherN+LowerN is equal to the number of long-term picture indicators. Then the following operations are performed:

for (i=0; i<LowerN; i++)
  LowerK[i]=//Parse a number K[i] as described above
  LowerV[i]=(i==0)? P−LowerK[i]−1: LowerV[i−1]−LowerK[i]−1;
for (j=0; j<HigherN; j++)
  HigherK[j]=//Parse a number K[j] as described above
  HigherV[j]=(j==0)? P+HigherK[j]+1: HigherV[j−1]+HigherK[j]+1;

where the lists LowerV and HigherV together hold all long-term picture indicators.

In another embodiment of the solution, the picture indicator value V[i] is explicitly signaled in the bitstream. Thus, V[i] is not derived from K[i] and no code word is decoded to derive K[i]. V[i] may in this embodiment be derived as A[i]*x+B[i], similar to how K[i] was derived as described above.

In yet another embodiment of the solution, the picture indicator value V[i] of at least one long-term picture is derived by subtracting the value K[i] from a picture indicator value V[i−y] of another long-term picture, where y is a non-zero integer. For instance, a first long-term picture is derived as V[0]=P−K[0]. A second long-term picture may then be derived as V[1]=V[0]−K[1]. When the long-term pictures are close to each other, this embodiment could provide bit savings (i.e., reduce the number of bits stored in memory). In another version of this embodiment, a codeword, e.g. a flag, is used to signal whether the indicator of a long-term picture V[i] is derived from the indicator of the current picture P or from an indicator of another long-term picture V[i−y].

As used herein, the operation to signal or for signaling an indicator may correspond to, for example, the encoder circuit including the indicator in the bit stream for detection by the decoder circuit.

Figure 2:
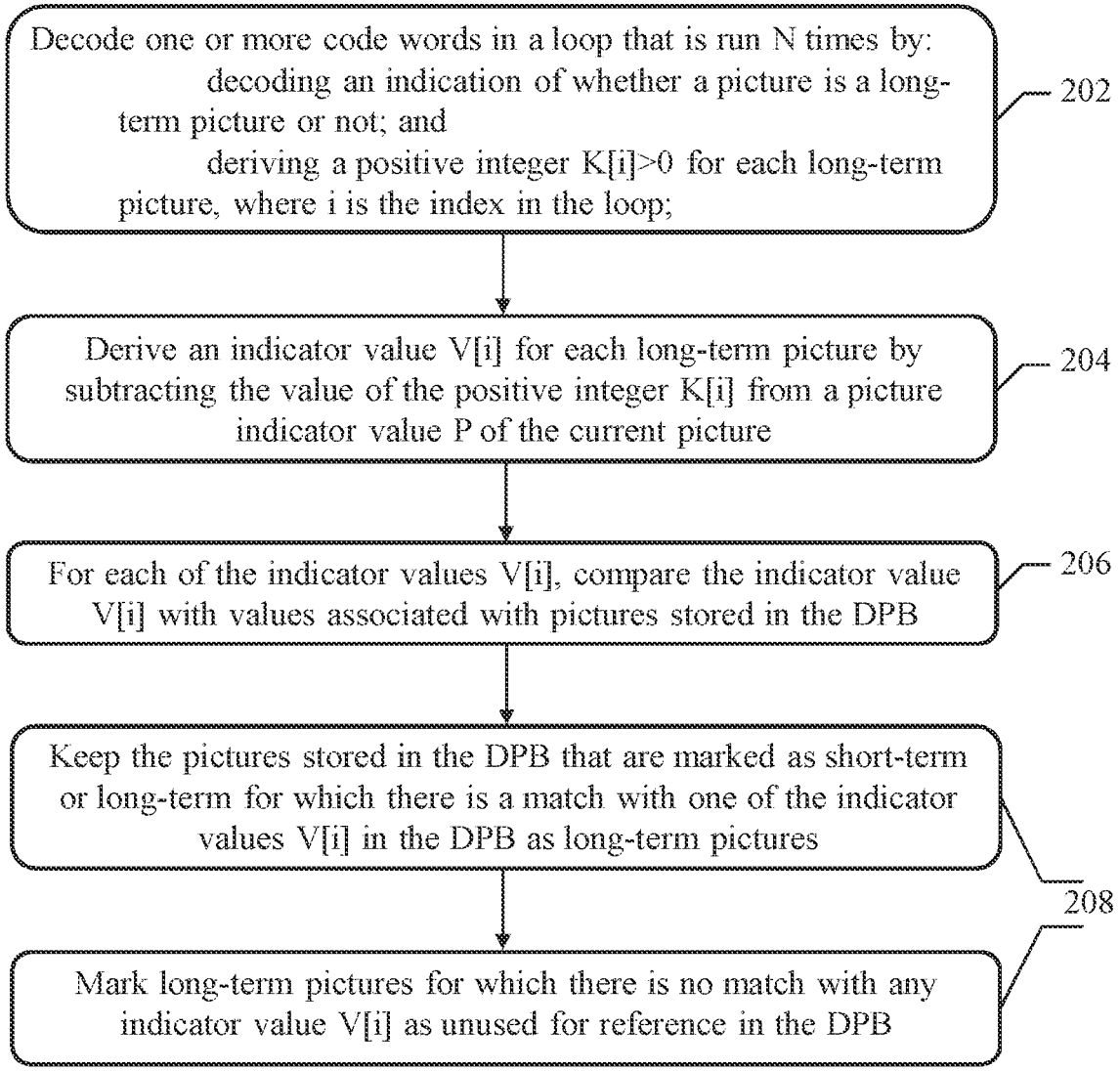
FIGS. 2 and 3 are flowcharts of operations performed by a decoder for decoding a current picture from a bitstream, in accordance with some embodiments.
Figure 3:
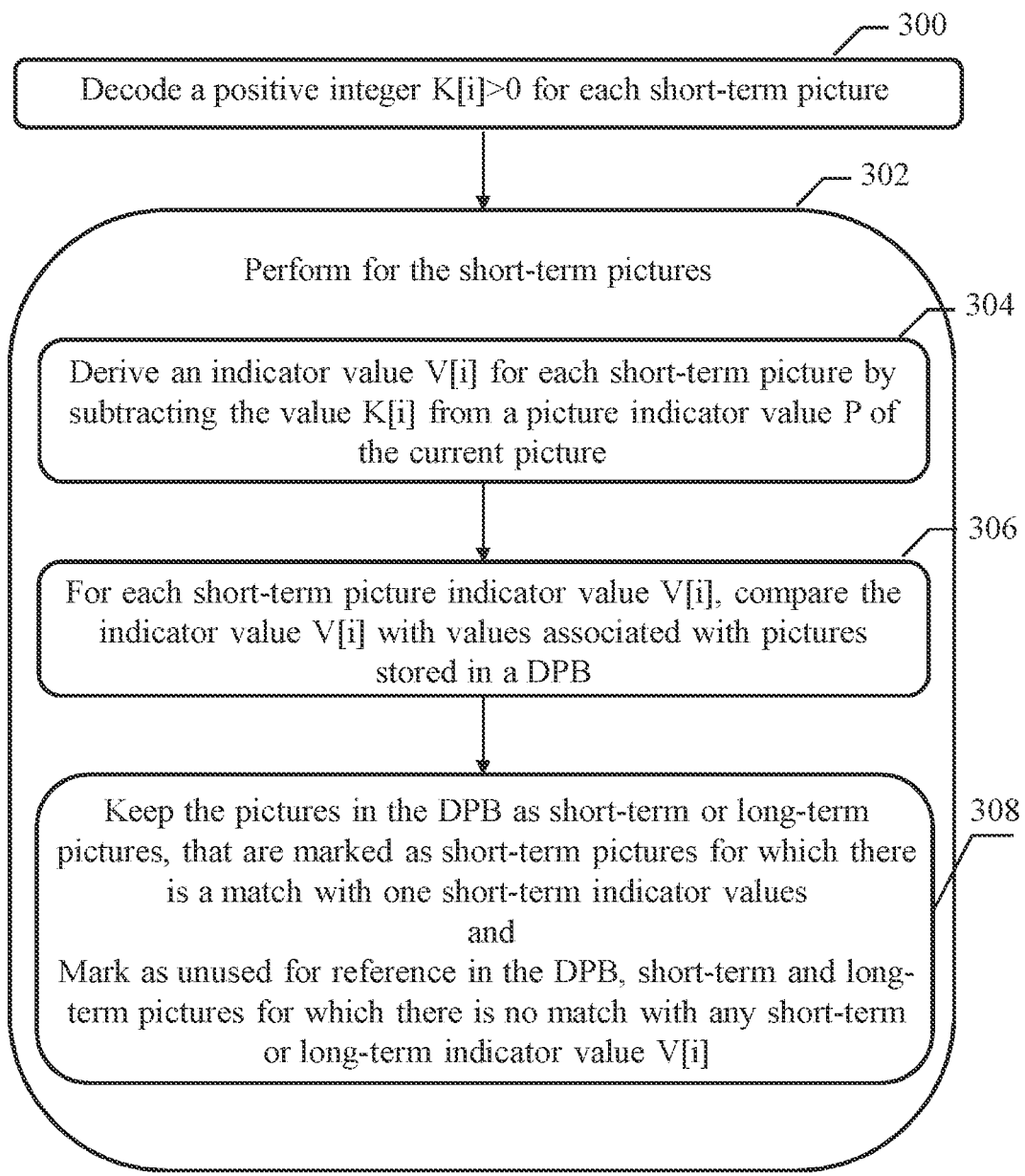

FIGS. 2 and 3 are flowcharts of operations performed by a picture decoder circuit for decoding a current picture from a bitstream, in accordance with some embodiments.

Referring to FIG. 2, the operations for decoding a current picture from a bitstream include decoding 202 one or more code words in a loop that is run N times by decoding an indication of whether a picture is a long-term picture or not and deriving a positive integer K[i]>0 for each long-term picture, where i is the index in the loop. Here N is the number of long-term and short-term pictures to keep in the DPB for the current picture. The operations derive 204 an indicator value V[i] for each long-term picture by subtracting the value of the positive integer K[i] from a picture indicator value P of the current picture. For each of the indicator values V[i], the operations compare 206 the indicator value V[i] with values associated with pictures stored in the DPB. The operations further keep the pictures stored in the DPB that are marked as short-term or long-term for which there is a match with one of the indicator values V[i] in the DPB as long-term pictures. The operations mark long-term pictures for which there is no match with any indicator value V[i] as unused for reference in the DPB.

The value of N can be greater than one.

The operations may further include removing a picture from the DPB that was marked as unused for reference, wherein the removal comprises not reading a portion of the memory that was allocated to keep the picture marked as unused for reference, until a new picture has been decoded into that portion of the memory. The removal of a picture from the DPB that was marked as unused for reference, can be performed during decoding of a next picture following the current picture not reading the portion of the memory that was allocated to keep the picture marked as unused for reference.

In these operations, the positive integer K[i] may be derived by two code words A[i] and B[i], where A[i] and B[i] are both positive integers >0 and K[i] is equal to A[i]*x+B[i]+k, where B[i] is signaled as-is using a fixed length code word of size n, A[i] is signaled using a variable length code, where x is equal to 2^n where ^ is the power operator and k is a constant value equal to 0 or 1.

The value for A[i] may be signaled using a Universal Variable Length Code, UVLC, code word. For example, a video encoder can include the UVLC codeword in the bitstream.

In a further embodiment of these operations, N is the number of long-term and short-term pictures to keep in the DPB for the current picture. The operation for decoding of one or more code words in the loop that is run N times, can include decoding an indication of whether a picture is a long-term picture or not.

Another further embodiment of these operations is shown in the flowchart of FIG. 3. Referring to FIG. 3, the decoding of one or more code words in the loop that is run N times, can further include decoding 300 a positive integer K[i]>0 for each short-term picture. The operations further include performing 302 for the short-term pictures: deriving 304 an indicator value V[i] for each short-term picture by subtracting the value K[i] from a picture indicator value P of the current picture; and for each short-term picture indicator value V[i], comparing 306 the indicator value V[i] with values associated with pictures stored in a decoded picture buffer (DPB), wherein pictures in the DPB that are marked as short-term pictures for which there is a match with one short-term indicator value V[i] are kept (308) in the DPB as short-term pictures or long-term pictures, and short-term and long-term pictures for which there is no match with any short-term or long-term indicator value V[i] are marked (308) as unused for reference in the DPB. A short-term picture in the DPB may be converted to a long-term picture if the distance to the current picture is too long to continue representing it as a short-term picture.

With further reference to FIGS. 2 and 3, the operations can further include decoding a code word indicating whether long-term pictures may be used for the current picture or not. Only when the code word that is decoded indicates that long-term pictures may be used, the operations decode the indication whether the current picture is a long-term picture or not.

In another further embodiment of these operations, a flag indicates whether one code word or a plurality of code words are to be used for decoding the positive integer K[i].

An offset value decoded from the bitstream may be added to A[i]*x+B[i] to derive K[i].

The indicator value V[i] for each long-term picture can be signaled explicitly. For example, a video encoder can include the indicator value V[i] for each long-term picture in the bitstream.

The indicator value V[i] for at least one long-term picture can be derived by subtracting the value K[i] from a picture indicator value V[i−y] of another long-term picture, where y is a non-zero integer.

Below is a detailed description of embodiments.

Embodiment 1

In a first embodiment of the present disclosure, the syntax for a solution on top of HEVC is shown in the syntax table in Table 4 and the semantics description below. As explained above, HEVC uses an RPS to handle reference pictures and uses a picture order count values for each picture.

As shown in the semantics below, the syntax builds a list PocLt[i]. This list contains the POC values for each long-term as long-term picture indicators. Each element in the list is derived as:
  PicOrderCntVal−(delta_poc_msb_lt[i]*MaxPicOrderCntLsb+delta_poc_lsb_lt[i]+n),
  where delta_poc_msb_lt[i] is a Universal Variable Length Code (UVLC) codeword and delta_poc_lsb_lt[i] is a fixed length code word using the same number of bits as pic_order_cnt_lsb. Each element in the list can equivalently be derived as:
  PicOrderCntVal−((delta_poc_msb_lt[i]<<shift_val)+delta_poc_lsb_lt[i]+n), where shift_val is equal to the number of bits used to signal delta_poc_lsb_lt[i].

The value n above may be equal to 0 or equal to 1. This means that the number of bits to spend for the POC part of a long-term picture indicator is equal to 9 for delta POC values between 1 and 256 given 8 bits are used for the lsb codeword since the lsb code word is then always 8 bit long and a value of 0 for the msb part costs 1 bit.

FIG. 1 is a graph that illustrates the bit cost for different delta POC values given a MaxPicOrderCntLsb equal to 256 (8 bits used for the lsb part). This corresponds well to the anticipated use of long-term pictures which is that they are kept for some time and then released. If the maximum UVLC code word is supposed to use at most 31 bits, with a MaxPicOrderCntLsb equal to 256, at most 39 bits should be spend on the delta POC. This means that the largest delta POC that can be sent within 39 bits is 16.8 million, which corresponds to 116 hours of video at 100 fps. There seems little need to store a reference picture for more than 100 hours of video which makes the solution sufficient. Besides, if there is a need, MaxPicOrderCntLsb could be increased.

TABLE 4

Example syntax

| slice_header( ) { | |
|---|---|
| ... | |
|   num_long_term_pics | ue(v) |
|   for( i = 0; i < num_long_term_pics; i++ ) { | |
|     delta_poc_msb_lt[ i ] | ue(v) |
|     delta_poc_lsb_lt[ i ] | u(v) |
|   } | |
| ... | |
| } | |

Semantics:
  num_long_term_pics specifies the number of entries in the long-term RPS of the current picture that are directly signalled in the slice header.

delta_poc_msb_lt[i] specifies the difference between the picture order count values of the current picture and the i-th entry in the long-term RPS of the current picture divided by MaxPicOrderCntLsb.

delta_poc_lsb_lt[i] specifies the difference between the picture order count values of the current picture and the i-th entry in the long-term RPS of the current picture modulo MaxPicOrderCntLsb.

used_by_curr_pic_lt_flag[i] equal to 0 specifies that the i-th entry in the long-term RPS of the current picture is not used for reference by the current picture.

used_by_curr_pic_lt_flag[i] equal to 1 specifies that the i-th entry in the long-term RPS of the current picture may be used for reference by the current picture.

The variable PocLt[i] is derived as follows:

PocLt[i] is set equal to PicOrderCntVal−(delta_poc_msb_lt[i]*MaxPicOrderCntLsb+delta_poc_lsb_lt[i]+1).

It is a requirement of bitstream conformance that PocLt[i] is not equal to PocLt[j] for any i and j in the range of 0 to num_long_term_pics−1, inclusive, unless i is equal to j.

Embodiment 2

In a second embodiment of the present disclosure, the short-term pictures and the long-term pictures are specified in the same loop and use partly the same syntax.

In this embodiment, there is one or more code words specifying the number N of pictures, including both short-term and long-term pictures, to be used as reference picture for the current picture. The decoder decodes the code word(s) and derives N. Then the decoder decodes a set of code words in a loop that it runs N times, i.e. once per picture (i.e. over both short-term and long-term pictures). In the loop there is at least one code word, and the decoder decodes that to derive a positive integer K[i] for each picture (both for short-term and long term). In one example, N is equal to 3, and there are then three values of K; K[0], K[1] and K[2]. In the example, the two first pictures are short-term picture and the last picture is a long-term picture.

The decoder uses the picture indicator value P for the current picture. For each picture (both short-term and long-term pictures), a picture indicator value V[i] is derived by subtracting the value K[i] from the picture indicator value P. Assuming in the example that the picture value of the current picture is P, we get V[0]=P−K[0], V[1]=P−K[1] and V[2]=P−K[2] as the three picture indicator values for the three pictures.

The decoder then goes through all pictures in the DPB and those pictures in the DPB for which there is a match with any picture indicator (V[0], V[1] or V[3] in the example above) are kept in the DPB. Pictures for which there is no match with any picture indicator are subject for removal from the DPB unless they are kept for reasons other than being used for reference for future pictures.

In one version of this embodiment, a flag is signaled to specify if a picture is a long-term picture. In yet another version of this embodiment if it is determined that a picture is a long-term picture, the value K[i] is derived in the decoder by decoding two code words A[i] and B[i]. Both are derived as integers and K[i] is derived as A[i]*x+B[i] where B[i] is signaled using a fixed length code word of size n, A[i] is signaled using a variable length code, and x is equal to 2^n where ^ is the power operator. A[i] and B[i] may both be positive integers. In the example above, K[0] and K[1] could be derived as K[0]=B[0] and K[1]=B[1], while K[2] could be derived as K[2]=A[2]*x+B[2].

In this embodiment, the code word specifying the number of pictures to keep does thus not only cover the long-term pictures but also covers the short-term pictures. For each picture in the loop it is further signaled whether the picture is a long-term picture or not. If a picture in the list is a long-term picture, the delta POC msb is signaled for the picture. Below is an example syntax and semantics for the second embodiment where num_pics is the number of signaled reference pictures, including both short-term and long-term pictures.

TABLE 5

| Example syntax | |
|---|---|
| for( i = 0; i < num_pics; i++ ) { | |
|   is_lt_pic_flag[ i ] | u(1) |
|   if ( lt_pic_flag[ i ] ) | |
|     delta_poc_msb_lt[ i ] | ue(v) |
|   delta_poc_lsb[ i ] | u(v) |
|   used_by_curr pic_flag [ i ] | u(1) |
| } | |

Semantics:

is_lt_pic_flag[i] equal to 1 specifies that the picture in the i-th entry in the RPS of the current picture is a long-term picture. is_lt_pic_flag[i] equal to 0 specifies that the picture in the i-th entry in the RPS of the current picture is a short-term picture. If not present, is_lt_pic_flag[i] is inferred to be 0.

delta_poc_msb_lt[i] specifies the difference between the picture order count values of the current picture and the i-th entry in the RPS of the current picture divided by MaxPicOrderCntLsb. If not present, delta_poc_msb[i] is inferred to be 0.

delta_poc_lsb[i] specifies the difference between the picture order count values of the current picture and i-th entry in the RPS of the current picture modulo MaxPicOrderCntLsb. The length of the delta_poc_lsb[i] syntax element is log2_max_pic_order_cnt_lsb_minus4+4 bits.

used_by_curr_pic_flag[i] equal to 0 specifies that the i-th entry in the RPS of the current picture is not used for reference by the current picture.

used_by_curr_pic_flag[i] equal to 1 specifies that the i-th entry in the RPS of the current picture may be used for reference by the current picture.

Operations for deriving the variables IsLtPic[i], Poc[i] and UsedByCurrPic[i] can include:

IsLtPic[i] is set equal to is_lt_pic_flag[i]

Poc[i] is set equal to IsLtPic[i]*delta_poc_msb[i]*MaxPicOrderCntLsb+delta_poc_lsb[i] and UsedByCurrPic[i] is set equal to used_by_curr_pic_flag[i].

It is a requirement of bitstream conformance that Poc[i] is not equal to 0 for any i in the range of 0 to num_pics−1, inclusive, when is_lt_pic_flag[i] is equal to 1.

In a variation of this embodiment, a guard flag is used to determine if long-term pictures are used at all. The guard flag may for instance be specified in the SPS, PPS, a picture header, or in a slice header. Syntax and semantics for this is exemplified in Table 6 below:

TABLE 6

Example syntax

```
use_lt_pics_flag                              u(1)
for( i = 0; i < num_pics; i++ )
{
  if ( use_lt_pics_flag ) {
    is_lt_pic_flag[ i ]                       u(1)
    if ( lt_pic_flag[ i ] )
      delta_poc_msb_lt[ i ]                   ue(v)
  }
  delta_poc_lsb[ i ]                          u(v)
  used_by_curr_pic_flag [ i ]                 u(1)
}
```

Semantics for use_lt_pics_flag (in e.g. PPS):
use_lt_pics_flag equal to 1 specifies that the RPS for the current picture may include long-term pictures. use_lt_pics_flag equal to 0 specifies that the RPS for the current picture may not include long-term pictures.

Embodiment 3

In a third embodiment of the present disclosure, the syntax for a solution on top of HEVC is shown in the syntax table in Table 7, below, and the semantics description following Table 7.

As shown in the semantics below, a list PocLt[i] is derived that contains the derived long-term picture indicators for the current pictures, where each long-term picture indicator is a POC value.

A decoder may exercise any one or more of the following enumerated steps in accordance with operations of the third embodiment:

1. Derive a value V1 from syntax elements in the bitstream, representing the number of long-term picture indicators that are smaller than the picture indicator for the current picture.
2. Derive a value V2 from syntax elements in the bitstream, representing the number of long-term picture indicators that are greater than the picture indicator for the current picture.
3. Do the following in a loop executed V1 number of times where i is an index in the loop having a value between 0 and V1−1 and P is the picture indicator for the current picture:
   Derive a value K[i] from two syntax elements A[i] and B[i] in the bitstream, wherein A[i] and B[i] are both positive integers >0 and K[i] is equal to A[i]*x+B[i], where B[i] is decoded as-is from fixed length code word of size n, A[i] is decoded from a variable length code, and x is equal to 2^n where ^ is the power operator.
   If i is equal to 0, derive a value PocLower[0] as PocLower[0]=P−K[i]. Alternatively, derive the value PocLower[0] as PocLower[0]=P−K[i]−1.
   If i is lager than 0, derive a value PocLower[i] as PocLower[i]=PocLower[i−1]−K[i]. Alternatively, derive the value PocLower[i] as PocLower[i]=PocLower[i−1]−K[i]−1.
4. Do the following in a loop executed V2 number of times where i is an index in the loop having a value between 0 and V2−1 and P is the picture indicator for the current picture:
   Derive a value K[i] from two syntax elements A[i] and B[i] in the bitstream, wherein A[i] and B[i] are both positive integers >0 and K[i] is equal to A[i]*x+B[i], where B[i] is decoded as-is from fixed length code word of size n, A[i] is decoded from a variable length code, and x is equal to 2^n where ^ is the power operator.
   If i is equal to 0, derive a value PocHigher[0] as PocHigher[0]=P+K[i]. Alternatively, derive the value PocHigher[0] as PocHigher[0]=P+K[i]+1.
   If i is lager than 0, derive a value PocHigher[i] as PocHigher[i]=PocHigher[i−1]+K[i]. Alternatively, derive the value PocHigher[i] as PocHigher[i]=PocHigher[i−1]+K[i]+1.
5. For each long-term picture indicator value in the list PocLt, compare the indicator value with values associated with pictures stored in a decoded picture buffer (DPB) and
   PocLt is a list with all elements from the two lists PocLower and PocHigher.
   pictures in the DPB that are marked as short-term or long-term for which there is a match between the picture indicator value of the DPB picture and one indicator value in the PocLt list are kept in the DPB as long-term pictures.
   pictures in the DPB that are marked as long-term pictures for which there is no match between the picture indicator value of the DPB picture and any indicator value in the PocLt list are marked as unused for reference in the DPB.
   The operations then remove at least one picture from the DPB that was marked as unused for reference where removal means that the memory that was allocated to keep the picture marked as unused for reference is not read again by the decoder until a picture has been decoded into that memory.

TABLE 7

Example syntax

```
slice_header( ) {
  ...
  num_lower_long_term_pics                              ue(v)
  num_higher_long_term_pics                             ue(v)
  for( i = 0; i < num_lower_long_term_pics ; i++ ) {
    delta_poc_msb_lower_lt[ i ]                         ue(v)
    delta_poc_lsb_lower_lt[ i ]                         u(v)
  }
  for( i = 0; i < num_higher_long_term_pics ; i++ ) {
    delta_poc_msb_higher_lt[ i ]                        ue(v)
    delta_poc_lsb_higher_lt[ i ]                        u(v)
  }
  ...
}
``` num_lower_long_term_pics specifies the number of long-term picture indicators that have picture order count values less than the picture order count value of the current picture.

num_higher_long_term_pics specifies the number of long-term picture indicators that have picture order count values greater than the picture order count value of the current picture.

delta_poc_msb_lower_lt[i] specifies the difference between the picture order count values of the current picture and the picture order count of a long-term picture divided by MaxPicOrderCntLsb.

delta_poc_lsb_lower_lt[i] specifies the difference between the picture order count values of the current picture and the picture order count of a long-term picture modulo MaxPicOrderCntLsb.

delta_poc_msb_higher_lt[i] specifies the difference between the picture order count values of the current picture and the picture order count of a long-term picture divided by MaxPicOrderCntLsb.

delta_poc_lsb_higher_lt[i] specifies the difference between the picture order count values of the current picture and the picture order count of a long-term picture modulo MaxPicOrderCntLsb.

If i is equal to 0, the following applies:
    DeltaPocLower[i]=−(delta_poc_msb_lower_lt[i]*MaxPicOrderCntLsb+delta_poc_lsb_lower_lt[i]+1)
    DeltaPocHigher[i]=delta_poc_msb_higher_lt[i]*MaxPicOrderCntLsb+delta_poc_lsb_higher_lt[i]+1

Otherwise, the following applies:
    DeltaPocLower[i]=DeltaPocLower[i−1]−(delta_poc_msb_lower_lt[i] *MaxPicOrderCntLsb+delta_poc_lsb_lower_lt[i]+1)
    DeltaPocHigher[i]=DeltaPocHigher[i−1]+delta_poc_msb_higher_lt[i] *MaxPicOrderCntLsb+delta_poc_lsb_higher_lt[i]+1

The variable PocLt[i] is derived as follows:
j=0
for (i=0; i<num_lower_long_term_pics; i++)
    PocLt[j++]=PicOrderCntVal+DeltaPocLower[i]
for (i=0; i<num_higher_long_term_pics; i++)
    PocLt[j++]=PicOrderCntVal+DeltaPocHigher[i]

It is a requirement of bitstream conformance that PocLt[i] is not equal to PocLt[j] for any i and j in the range of 0 to num_long_term_pics−1, inclusive, unless i is equal to j.

Embodiment 4

In a fourth embodiment of the present disclosure, there is one more code word signaled to the decoder which specifies an offset value. This offset value will then be used in the process of deriving the POC value(s) of the long-term picture(s).

In one variant of this embodiment, the offset value is signaled in addition to the msb for the long-term pictures. In this case, msb values for the long-term pictures could be signaled with smaller code words which could provide bit savings (i.e., reduce the number of bits stored in memory). One example is when there is a known minimum difference between the POC of the current picture and the POC of the closest long-term picture to the current picture. This known minimum value can be set e.g. equal to the maximum delta-POC value of a short-term picture compared to the current picture. In this example, the POC value of all the long-term pictures may be signaled relative to the offset value and the final POC value of the long-term pictures may be calculated by adding the signaled offset value to the relative POC values of the long-term pictures. In another variant of this embodiment, the offset value may replace the usage of the msb for the long-term pictures. This could provide bit savings since the offset value is signaled once but the msb value is signaled for each long-term picture.

A flag may specify the usage of the offset value.

An example syntax table on top of syntax for Embodiment 1 is given in Table 8, below:

TABLE 8

| Example syntax | |
| --- | --- |
| slice_header( ) { | |
| ... | |
|   long_term_offset_flag | u(1) |
|   if (long_term_offset_flag) | |
|     long_term_offset | ue(v) |

TABLE 8-continued

| Example syntax | |
| --- | --- |
|   num_long_term_pics | ue(v) |
|   for( i = 0; i < num_long_term_pics; i++ ) { | |
|     delta_poc_msb_lt[ i ] | ue(v) |
|     delta_poc_lsb_lt[ i ] | u(v) |
|     used_by_curr_pic_lt_flag[ i ] | u(1) |
|   } | |
| ... | |
| } | | long_term_offset_flag equal to 1 specifies that an offset value for the long-term pictures will be used. long_term_offset_flag equal to 0 specifies that the offset value for the long-term pictures will not be used. When not specified, long_term_offset_flag is inferred to be equal to 0.

long_term_offset specifies the offset value for the long-term pictures which is going to be used in the derivation of the long-term picture indicator(s). When it is not present it is inferred to be equal to 0.

delta_poc_msb_lt[i] specifies the difference between the picture order count values of the current picture minus long_term_offset_flag*long_term_offset and the i-th entry in the long-term RPS of the current picture divided by MaxPicOrderCntLsb.

delta_poc_lsb_lt[i] specifies the difference between the picture order count values of the current picture minus long_term_offset_flag*long_term_offset and the i-th entry in the long-term RPS of the current picture modulo MaxPicOrderCntLsb.

used_by_curr_pic_lt_flag[i] equal to 0 specifies that the i-th entry in the long-term RPS of the current picture is not used for reference by the current picture. used_by_curr_pic_lt_flag[i] equal to 1 specifies that the i-th entry in the long-term RPS of the current picture may be used for reference by the current picture.

If long_term_offset_flag is set to 1 and long_term_offset value is signaled, the list PocLt[i] may be calculated as follows compared to the Embodiment 1:
    PicOrderCntVal−(delta_poc_msb_lt[i]*MaxPicOrderCntLsb+delta_poc_lsb_lt[i]+long_term_offset+n), where delta_poc_msb_lt[i] is a UVLC codeword, delta_poc_lsb_lt[i] is a fixed length code word using the same number of bits as pic_order_cnt_lsb, long_term_offset is a UVLC codeword and n above may be equal to 0 or equal to 1.

This embodiment may be combined with any of the other embodiments.

Figure 4:
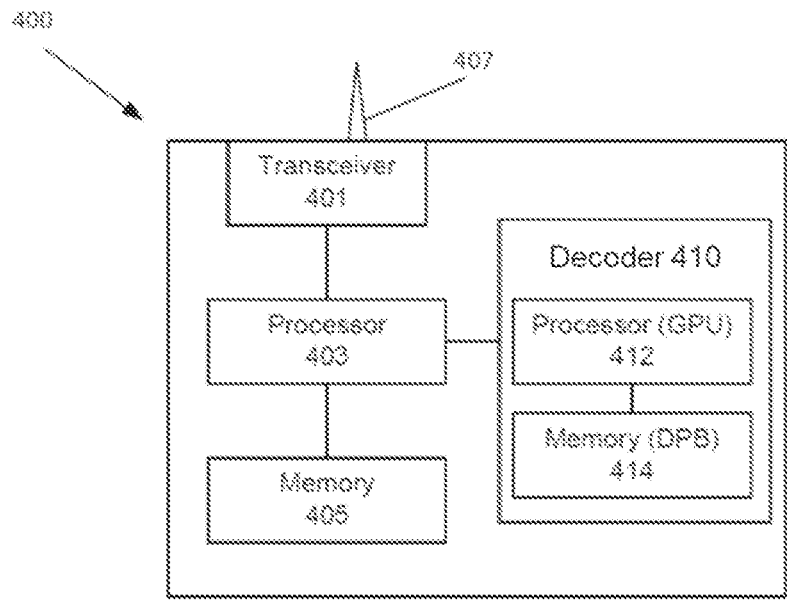
FIG. 4 is a block diagram illustrating a UE with a decoder that is configured to operate according to some embodiments.

FIG. 4 is a block diagram illustrating a UE 400 having a decoder 410 that is configured according to some embodiments. The UE 400 can include, without limitation, a wireless terminal, a wireless communication device, a wireless communication terminal, a UE node/terminal/device, gaming console, video media player, etc. The UE 400 is configured to provide wired and/or wireless communications. When configured for wireless communications, the UE 400 includes an antenna 407 and a transceiver circuit 401 (also referred to as a transceiver) including a transmitter and a receiver configured to provide uplink and downlink radio communications with other UEs and/or a radio access network RAN node (e.g., a base station, eNB, gNB, network node, etc.) of a wireless communication network. UE 400 further includes a processor circuit 403 (also referred to as a processor) coupled to the transceiver circuit 401, and a memory circuit 405 (also referred to as memory) coupled to the processor circuit 403. The processor 403 is also coupled to a decoder 410 which includes a processor 412 (e.g., a graphics processing unit) coupled to a memory 414 which can store the decoded picture buffer (DPB). The memory 414 stores computer readable program code that when executed by the processor 412 causes the processor 412 to perform operations according to embodiments disclosed herein.

According to other embodiments, the decoder 410 may be implemented as an application specific integrated circuit or other decoding, and the operations thereof may be at least partially or entirely performed by the processor 403 executing operations from the memory 405. The UE 400 can receive a bitstream containing pictures for decoding from another UE, network node, removable memory device, etc. The UE 400 may also contain an encoder circuit that is configured to encode pictures in accordance with one or more embodiments disclosed herein, and may communicate the encoded pictures to another UE, network node, etc.

Figure 5:
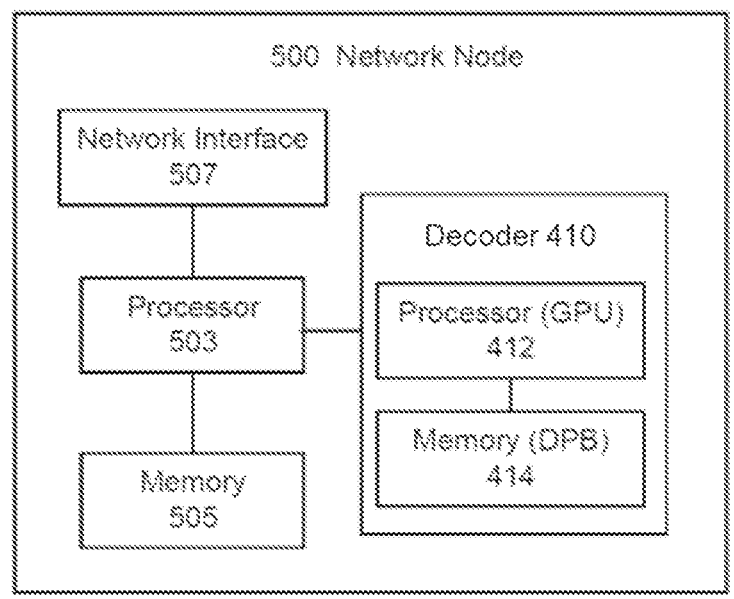
FIG. 5 is a block diagram illustrating a network node with a decoder that is configured to operate according to some embodiments.

FIG. 5 is a block diagram illustrating a network node 500 having a decoder 410 that is configured according to some embodiments. The network node 500 can include, without limitation, a video encoder node, a webserver computer, a video server, a base station, eNB, gNB, etc. As shown, the network node 500 includes a network interface 507 (e.g., wired network interface and/or wireless network interface) coupled to a processor circuit 503 (also referred to as a processor), and a memory circuit 505 (also referred to as memory) coupled to the processor 503. The processor 503 is also coupled to a decoder 410 which includes a processor 412 (e.g., a graphics processing unit) coupled to a memory 414 which can store the decoded picture buffer. The memory 414 stores computer readable program code that when executed by the processor 412 causes the processor 412 to perform operations according to embodiments disclosed herein. According to other embodiments, the decoder 410 may be implemented as an application specific integrated circuit or other video decoding circuit, and the operations thereof may be at least partially or entirely performed by the processor 503 executing operations from the memory 505.

An encoder can include a processor coupled to a memory, and the processor may be further coupled to a network interface for storage of encoded pictures to a mass memory or for communication through a network (e.g. wired or wireless network) to an electronic device having a decoder which can operate according to embodiments herein.

The memory stores computer readable program code that when executed by the processor causes the processor to perform operations according to embodiments disclosed herein by an encoder. The network node 500 can receive a bitstream containing pictures for decoding from a UE, another network node, removable memory device, etc. The network node 500 may also contain a picture encoder circuit that is configured to encode pictures in accordance with one or more embodiments disclosed herein, and may communicate the encoded pictures to a UE, another network node, etc.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows. Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

APPENDIX

Series H: Audiovisual and Multimedia Systems
Infrastructure of audiovisual services-Coding of moving video
High Efficiency Video Coding

3 Definitions

For the purposes of this Recommendation | International Standard, the following definitions apply:

3.42 decoded picture buffer (DPB): A buffer holding decoded pictures for reference, output reordering, or output delay 3.84 long-term reference picture: A picture that is marked as "used for long-term reference".

3.85 long-term reference picture set: The two reference picture set (RPS) lists that may contain long-term reference pictures.

3.132 reference picture: A picture that is a short-term reference picture or a long-term reference picture.

NOTE—A reference picture contains samples that may be used for inter prediction in the decoding process of subsequent pictures in decoding order.

3.136 reference picture set (RPS): A set of reference pictures associated with a picture, consisting of all reference pictures that are prior to the associated picture in decoding order, that may be used for inter prediction of the associated picture or any picture following the associated picture in decoding order.

NOTE—The RPS of a picture consists of five RPS lists, three of which are to contain short-term reference pictures and the other two are to contain long-term reference pictures.

3.147 short-term reference picture set: The three RPS lists that may contain short-term reference pictures.

4

5

6

7

7.3.2.1
7.3.2.2 Sequence Parameter Set RBSP Syntax
7.3.2.2.1 General Sequence Parameter Set RBSP Syntax

| seq_parameter_set_rbsp( ) { | Descriptor |
|---|---|
| ... | |
| num_short_term_ref_pic_sets | ue(v) |
| for( i = 0; i < num_short_term_ref_pic_sets; i++) | |
|   st_ref_pic_set( i ) | |
| long_term_ref_pics_present_flag | u(1) |
| ... | |
| } | |

7.3.6.1 General Slice Segment Header Syntax

| slice_header( ) { | Descriptor |
|---|---|
| ... | |
| if( nal_unit_type != IRAP_NUT) { | |
|   slice_pic_order_cnt_lsb | u(v) |
|   short_term_ref_pic_set_sps_flag | u(1) |
|   if( !short_term_ref_pic_set_sps_flag ) | |
|     st_ref_pic_set( num_short_term_ref_pic_sets ) | |
|   else if( num_short_term_ref_pic_sets > 1) | |
|     short_term_ref_pic_set_idx | u(v) |
|   if( long_term_ref_pics_present_flag ) { | |
|     num_long_term_pics | ue(v) |
|     for( i = 0; i < num_long_term_pics; i++ ) { | |
|       delta_poc_msb_lt[ i ] | ue(v) |
|       delta_poc_lsb_lt_minus1[ i ] | u(v) |
|       used_by_curr_pic_lt_flag[ i ] | u(1) |
|     } | |
|   } | |
| } | |
| ... | |
| } | |

7.3.7 Short-Term Reference Picture Set Syntax

| | Descriptor |
|---|---|
| st_ref_pic_set( stRpsIdx ) { | |
|   num_negative_pics | ue(v) |
|   num_positive_pics | ue(v) |
|   for( i = 0; i < num_negative_pics; i++ ) { | |
|     delta_poc_s0_minus1[ i ] | ue(v) |
|     used_by_curr_pic_s0_flag[ i ] | u(1) |
|   } | |
|   for( i = 0; i < num_positive_pics; i++ ) { | |
|     delta_poc_s1_minus1 [ i ] | ue(v) |
|     used_by_curr_pic_s1_flag[ i ] | u(1) |
|   } | |
| } | |

7.4.3.1
7.4.3.2 Sequence Parameter Set RBSP Semantics
7.4.3.2.1 General Sequence Parameter Set RBSP Semantics num_short_term_ref_pic_sets specifies the number of st_ref_pic_set( ) syntax structures included in the SPS. The value of num_short_term_ref_pic_sets shall be in the range of 0 to 64, inclusive.

NOTE 5—A decoder should allocate memory for a total number of num_short_term_ref_pic_sets+1 st_ref_pic_set( ) syntax structures since there may be a st_ref_pic_set( ) syntax structure directly signalled in the slice headers of a current picture. A st_ref_pic_set( ) syntax structure directly signalled in the slice headers of a current picture has an index equal to num_short_term_ref_pic_sets.

long_term_ref_pics_present_flag equal to 0 specifies that no long-term reference picture is used for inter prediction of any coded picture in the CVS.

long_term_ref_pics_present_flag equal to 1 specifies that long-term reference pictures may be used for inter prediction of one or more coded pictures in the CVS.

7.4.7 Slice Segment Header Semantics
7.4.7.1 General Slice Segment Header Semantics When present, the value of the slice segment header syntax elements slice_pic_parameter_set_id, slice_pic_order_cnt_lsb, short_term_ref_pic_set_sps_flag, short_term_ref_pic_set_idx and num_long_term_pics shall be the same in all slice segment headers of a coded picture. When present, the value of the slice segment header syntax elements delta_poc_msb_lt[i], delta_poc_lsb_lt_minus1[i] and used_by_curr_pic_lt_flag[i] shall be the same in all slice segment headers of a coded picture for each possible value of i.

short_term_ref_pic_set_sps_flag equal to 1 specifies that the short-term RPS of the current picture is derived based on one of the st_ref_pic_set( ) syntax structures in the active SPS that is identified by the syntax element short_term_ref_pic_set_idx in the slice header. short_term_ref_pic_set_sps_flag equal to 0 specifies that the short-term RPS of the current picture is derived based on the st_ref_pic_set( ) syntax structure that is directly included in the slice headers of the current picture. When num_short_term_ref_pic_sets is equal to 0, the value of short_term_ref_pic_set_sps_flag shall be equal to 0.

short_term_ref_pic_set_idx specifies the index, into the list of the st_ref_pic_set( ) syntax structures included in the active SPS, of the st_ref_pic_set( ) syntax structure that is used for derivation of the short-term RPS of the current picture. The syntax element short_term_ref_pic_set_idx is represented by Ceil (Log2 (num_short_term_ref_pic_sets)) bits. When not present, the value of short_term_ref_pic_set_idx is inferred to be equal to 0.

The value of short_term_ref_pic_set_idx shall be in the range of 0 to num_short_term_ref_pic_sets−1, inclusive.

The variable CurrRpsIdx is derived as follows:
If short_term_ref_pic_set_sps_flag is equal to 1, CurrRpsIdx is set equal to short_term_ref_pic_set_idx.
Otherwise, CurrRpsIdx is set equal to num_short_term_ref_pic_sets.

num_long_term_pics specifies the number of entries in the long-term RPS of the current picture that are directly signalled in the slice header. When not present, the value of num_long_term_pics is inferred to be equal to 0.

delta_poc_msb_lt[i] specifies the difference between the picture order count values of the current picture and i-th entry in the long-term RPS of the current picture divided by MaxPicOrderCntLsb.

delta_poc_lsb_lt_minus1[i] plus 1 specifies the difference between the picture order count values of the current picture and i-th entry in the long-term RPS of the current picture modulo MaxPicOrderCntLsb. The length of the delta_poc_lsb_lt_minus1[i] syntax element is log2_max_pic_order_cnt_lsb_minus4+4 bits.

used_by_curr_pic_lt_flag[i] equal to 0 specifies that the i-th entry in the long-term RPS of the current picture is not used for reference by the current picture.

The variables DeltaPocLt[i] and UsedByCurrPicLt[i] are derived as follows:
DeltaPocLt[i] is set equal to delta_poc_msb_lt[i]*MaxPicOrderCntLsb+delta_poc_lsb_lt_minus1[i]+1 and UsedByCurrPicLt[i] is set equal to used_by_curr_pic_lt_flag[i].

It is a requirement of bitstream conformance that DeltaPocLt[i] is not equal to DeltaPocLt[j] for any i and j in the range of 0 to num_long_term_pics−1, inclusive, unless i is equal to j.

7.4.8 Short-Term Reference Picture Set Semantics

The st_ref_pic_set(stRpsIdx) syntax structure may be present in an SPS or in a slice header. Depending on whether the syntax structure is included in a slice header or an SPS, the following applies:

If present in a slice header, the st_ref_pic_set(stRpsIdx) syntax structure specifies the short-term RPS of the current picture (the picture containing the slice), and the following applies:
The content of the st_ref_pic_set(stRpsIdx) syntax structure shall be the same in all slice headers of the current picture.
The value of stRpsIdx shall be equal to the syntax element num_short_term_ref_pic_sets in the active SPS.
The short-term RPS of the current picture is also referred to as the num_short_term_ref_pic_sets-th candidate short-term RPS in the semantics specified in the remainder of this clause.

Otherwise (present in an SPS), the st_ref_pic_set(stRpsIdx) syntax structure specifies a candidate short-term RPS, and the term "the current picture" in the semantics specified in the remainder of this clause refers to each picture that has short_term_ref_pic_set_idx equal to stRpsIdx in a CVS that has the SPS as the active SPS.

num_negative_pics specifies the number of entries in the stRpsIdx-th candidate short-term RPS that have picture order count values less than the picture order count value of the current picture.

num_positive_pics specifies the number of entries in the stRpsIdx-th candidate short-term RPS that have picture order count values greater than the picture order count value of the current picture.

delta_poc_s0_minus1[i] plus 1, when i is equal to 0, specifies the difference between the picture order count values of the current picture and i-th entry in the stRpsIdx-th candidate short-term RPS that has picture order count value less than that of the current picture, or, when i is greater than 0, specifies the difference between the picture order count values of the (i−1)-th entry and the i-th entry in the stRpsIdx-th candidate short-term RPS that have picture order count values less than the picture order count value of the current picture. The value of delta_poc_s0_minus1[i] shall be in the range of 0 to 215-1, inclusive.

used_by_curr_pic_s0_flag[i] equal to 0 specifies that the i-th entry in the stRpsIdx-th candidate short-term RPS that has picture order count value less than that of the current picture is not used for reference by the current picture.

delta_poc_s1_minus1[i] plus 1, when i is equal to 0, specifies the difference between the picture order count values of the current picture and the i-th entry in the stRpsIdx-th candidate short-term RPS that has picture order count value greater than that of the current picture, or, when i is greater than 0, specifies the difference between the picture order count values of the i-th entry and the (i−1)-th entry in the current candidate short-term RPS that have picture order count values greater than the picture order count value of the current picture. The value of delta_poc_s1_minus1[i] shall be in the range of 0 to 215-1, inclusive.

used_by_curr_pic_s1_flag[i] equal to 0 specifies that the i-th entry in the current candidate short-term RPS that has picture order count value greater than that of the current picture is not used for reference by the current picture.

The variables NumNegativePics [stRpsIdx], NumPositivePics [stRpsIdx],
UsedByCurrPicS0[stRpsIdx][i], UsedByCurrPicS1[stRpsIdx][i],
DeltaPocS0[stRpsIdx][i] and DeltaPocS1[stRpsIdx][i] are derived as follows:
NumNegativePics [stRpsIdx]=num_negative_pics (7-63)
NumPositivePics [stRpsIdx]=num_positive_pics (7-64)
UsedByCurrPicS0[stRpsIdx][i]=
used_by_curr_pic_s0_flag[i] (7-65)
UsedByCurrPicS1[stRpsIdx][i]=
used_by_curr_pic_s1_flag[i] (7-66)
If i is equal to 0, the following applies:
DeltaPocS0[stRpsIdx][i]=−(delta_poc_s0_minus1[i]+1) (7-67)
DeltaPocS1[stRpsIdx][i]=delta_poc_s1_minus1[i]+1 (7-68)
Otherwise, the following applies:
DeltaPocS0[stRpsIdx][i]=DeltaPocS0[stRpsIdx][i−1]−(delta_poc_s0_minus1 [i]+1) (7-69)
DeltaPocS1[stRpsIdx][i]=DeltaPocS1[stRpsIdx][i−1]+(delta_poc_s1_minus1 [i]+1) (7-70)

It is a requirement of bitstremam conformance that DeltaPocS0[stRpsIdx][i] is not equal to DeltaPocLt[j], for any j in the range of 0 to num_long_term_pics, inclusive.

8 Decoding Process 8.1 General Decoding Process
8.2 NAL Unit Decoding Process
8.3 Slice Decoding Process
8.3.1
8.3.2 Decoding Process for Reference Picture Set
This process is invoked once per picture, after decoding of a slice header but prior to the decoding of any coding unit. This process may result in one or more reference pictures in the DPB being marked as "unused for reference" or "used for long-term reference".

NOTE 1—The RPS is an absolute description of the reference pictures used in the decoding process of the current and future coded pictures. The RPS signalling is explicit in the sense that all reference pictures included in the RPS are listed explicitly.

A decoded picture in the DPB can be marked as "unused for reference", "used for short-term reference" or "used for long-term reference", but only one among these three at any given moment during the operation of the decoding process. Assigning one of these markings to a picture implicitly removes another of these markings when applicable. When a picture is referred to as being marked as "used for reference", this collectively refers to the picture being marked as "used for short-term reference" or "used for long-term reference" (but not both).

When the current picture is an IRAP picture, all reference pictures currently in the DPB (if any) are marked as "unused for reference".

Short-term and long-term reference pictures are identified by their PicOrderCntVal values. Five lists of picture order count values are constructed to derive the RPS. These five lists are PocStCurrBefore, PocStCurrAfter, PocStFoll, PocLtCurr and PocLtFoll, with NumPoc, NumPocStCurrBefore, NumPocStCurrAfter, NumPocStFoll, NumPocLtCurr and NumPocLtFoll number of elements, respectively. The five lists and the five variables are derived as follows:

If the current picture is an IDR picture, PocStCurrBefore, PocStCurrAfter, PocStFoll, PocLtCurr and PocLtFoll are all set to be empty, and NumPocStCurrBefore, NumPocStCurrAfter, NumPocStFoll, NumPocLtCurr and NumPocLtFoll are all set equal to 0.

Otherwise, the following applies:
for (i=0, j=0, k=0; i<NumNegativePics [CurrRpsIdx]; i++) if (UsedByCurrPicS0[CurrRpsIdx][i])
PocStCurrBefore[j++]=PicOrderCntVal+DeltaPocS0[CurrRpsIdx][i] else
PocStFoll [k++]=PicOrderCnt Val+DeltaPocS0 [CurrRpsIdx][i] NumPocStCurrBefore=j
for (i=0, j=0; i<NumPositivePics [CurrRpsIdx]; i++)
if (UsedByCurrPicS1[CurrRpsIdx][i])
PocStCurrAfter[j++]=PicOrderCnt Val+DeltaPocS1 [CurrRpsIdx][i] else
PocStFoll [k++]=PicOrderCnt Val+DeltaPocS1 [CurrRpsIdx][i] NumPocStCurrAfter=j
NumPocStFoll=k (8-5)
for (i=0, j=0, k=0; i<num_long_term_pics; i++) {
if (UsedByCurrPicLt[i]) {
PocLtCurr [j++]=PicOrderCntVal−DeltaPocLt[i]}
else {
PocLtFoll[k++]=PicOrderCntVal−DeltaPocLt[i]
}
}
NumPocLtCurr=j
NumPocLtFoll=k
where PicOrderCntVal is the picture order count of the current picture as specified in clause 8.3.1.

NOTE 2—A value of CurrRpsIdx in the range of 0 to num_short_term_ref_pic_sets−1, inclusive, indicates that a candidate short-term RPS from the active SPS for the current layer is being used, where CurrRpsIdx is the index of the candidate short-term RPS into the list of candidate short-term RPSs signalled in the active SPS for the current layer. CurrRpsIdx equal to num_short_term_ref_pic_sets indicates that the short-term RPS of the current picture is directly signalled in the slice header.

It is a requirement of bitstream conformance that the following applies to the value of NumPicTotalCurr:

When the current picture contains a P or B slice, the value of NumPicTotalCurr shall not be equal to 0.

The RPS of the current picture consists of five RPS lists; RefPicSetStCurrBefore, RefPicSetStCurrAfter, RefPicSetStFoll, RefPicSetLtCurr and RefPicSetLtFoll. RefPicSetStCurrBefore, RefPicSetStCurrAfter and RefPicSetStFoll are collectively referred to as the short-term RPS. RefPicSetLtCurr and RefPicSetLtFoll are collectively referred to as the long-term RPS.

NOTE 3—RefPicSetStCurrBefore, RefPicSetStCurrAfter and RefPicSetLtCurr contain all reference pictures that may be used for inter prediction of the current picture and one or more pictures that follow the current picture in decoding order. RefPicSetStFoll and RefPicSetLtFoll consist of all reference pictures that are not used for inter prediction of the current picture but may be used in inter prediction for one or more pictures that follow the current picture in decoding order.

The derivation process for the RPS and picture marking are performed according to the following ordered steps:
1. The following applies:
for (i=0; i<NumPocLtCurr; i++)
    if (there is a reference picture picX in the DPB with PicOrderCntVal equal to PocLtCurr[i])
        RefPicSetLtCurr[i]=picX
    else
        RefPicSetLtCurr[i]= "no reference picture"    (8-6)
for (i=0; i<NumPocLtFoll; i++)
    if (there is a reference picture picX in the DPB with PicOrderCntVal equal to PocLtFoll[i])
        RefPicSetLtFoll[i]=picX
    else
        RefPicSetLtFoll[i]= "no reference picture"
2. All reference pictures that are included in RefPicSetLtCurr or RefPicSetLtFoll are marked as "used for long-term reference".
3. The following applies:
for (i=0; i<NumPocStCurrBefore; i++)
    if (there is a short-term reference picture picX in the DPB with PicOrderCntVal equal to PocStCurrBefore[i])
        RefPicSetStCurrBefore[i]=picX
    else
        RefPicSetStCurrBefore[i]= "no reference picture"
for (i=0; i<NumPocStCurrAfter; i++)
    if (there is a short-term reference picture picX in the DPB with PicOrderCnt Val equal to PocStCurrAfter[i])
        RefPicSetStCurrAfter[i]=picX
    else
        RefPicSetStCurrAfter[i]= "no reference picture"    (8-7)
for (i=0; i<NumPocStFoll; i++)
    if (there is a short-term reference picture picX in the DPB with PicOrderCnt Val equal to PocStFoll[i]) RefPicSetStFoll[i]=picX
    else
        RefPicSetStFoll[i]= "no reference picture"
4. All reference pictures in the DPB that are not included in RefPicSetLtCurr, RefPicSetLtFoll, RefPicSetStCurrBefore, RefPicSetStCurrAfter, or RefPicSetStFoll are marked as "unused for reference".

NOTE 4—There may be one or more entries in the RPS lists that are equal to "no reference picture" because the corresponding pictures are not present in the DPB. Entries in RefPicSetStFoll or RefPicSetLtFoll that are equal to "no reference picture" should be ignored. An unintentional picture loss should be inferred for each entry in RefPicSetStCurrBefore, RefPicSetStCurrAfter, or RefPicSetLtCurr that is equal to "no reference picture".

NOTE 5—A picture cannot be included in more than one of the five RPS lists.

It is a requirement of bitstream conformance that the RPS is restricted as follows:

There shall be no entry in RefPicSetStCurrBefore, RefPicSetStCurrAfter or RefPicSetLtCurr for which one or more of the following are true:
  The entry is equal to "no reference picture".
  The entry is a picture that has TemporalId greater than that of the current picture.
There shall be no entry in RefPicSetLtCurr or RefPicSetLtFoll for which the difference between the picture order count value of the current picture and the picture order count value of the entry is greater than or equal to $2^{24}$.

The invention claimed is:

1. A method for decoding a current picture from a bitstream, the method comprising
    decoding one or more code words specifying a number N of pictures, including both short-term and long-term pictures;
    decoding one or more code words in a loop that is run N times by:
        decoding an indication of whether a picture is a long-term picture or not;
    deriving an integer K[i] for each long-term picture i, wherein the integer K[i] is derived by two code words A[i] and B[i], wherein B[i] is signaled using a fixed length code word of size n, and A[i] is signaled using a variable length code;
    deriving an indicator value V[i] for at least one long-term picture based on the value of the integer K[i] and a picture indicator value P of the current picture; and
    for each of the indicator values V[i], comparing the indicator value V[i] with values associated with pictures stored in the DPB,
    keeping the pictures stored in the DPB that are marked as short-term or long-term for which there is a match with one of the indicator values V[i] in the DPB as long-term pictures, and
    marking long-term pictures for which there is no match with any indicator value V[i] as unused for reference in the DPB.

2. The method of claim 1 wherein deriving the indicator value V[i] for at least one of the long-term pictures comprises subtracting the value of the integer K[i] from the picture indicator value P.

3. The method of claim 1, further comprising:
    removing a picture from the DPB that was marked as unused for reference, wherein the removal comprises not reading a portion of the memory that was allocated to keep the picture marked as unused for reference, until a new picture has been decoded into the portion of the memory.

4. The method of claim 3, wherein the removing a picture from the DPB that was marked as unused for reference comprises:
    during decoding of a next picture following the current picture, not reading the portion of the memory that was allocated to keep the picture marked as unused for reference.

5. The method of claim 1, wherein A[i] and B[i] are both positive integers >0 and B[i] is signaled as-is using the fixed length code word of size n, and K[i] is equal to A[i]*x+B[i]+k and x is equal to 2^n wherein ^ is the power operator, and k is a constant value equal to 0 or 1.

6. The method of claim 5, wherein an offset value decoded from the bitstream is added to A[i]*x+B[i] to derive K[i].

7. The method of claim 1, wherein A[i] is signaled using a Universal Variable Length Code, UVLC, code word.

8. The method of claim 1,
wherein the decoding of one or more code words in the loop that is run N times, further comprises decoding an integer K[i]>0 for each short-term picture; and
further comprising performing for the short-term pictures:
  deriving an indicator value V[i] for each short-term picture by subtracting the value K[i] from a picture indicator value P of the current picture;
  for each short-term picture indicator value V[i], comparing the indicator value V[i] with values associated with pictures stored in a decoded picture buffer (DPB), wherein
  pictures in the DPB that are marked as short-term pictures for which there is a match with one short-term indicator value V[i] are kept in the DPB as short-term pictures and short-term pictures for which there is no match with any short-term or long-term indicator value V[i] are marked as unused for reference in the DPB.

9. The method of claim 1, further comprising:
decoding a code word indicating whether long-term pictures may be used for the current picture or not; and
only when the code word that is decoded indicates that long-term pictures may be used, decoding the indication whether the current picture is a long-term picture or not.

10. The method of claim 1, wherein a flag indicates whether one code word or a plurality of code words are to be used for decoding the integer K[i].

11. The method of claim 1, wherein N>1.

12. The method of claim 1, wherein the indicator value V[i] for each long-term picture is signaled explicitly.

13. The method of claim 1, wherein the indicator value V[i] for at least one long-term picture is derived by subtracting the value K[i] from a picture indicator value V[i−y] of another long-term picture, wherein y is a non-zero integer.

14. A decoder for decoding a current picture from a bitstream, the decoder comprising:
  a processor; and
  a memory coupled to the processor, wherein the memory stores a decoded picture buffer, DPB, and instructions that when executed by the processor causes the processor to perform operations comprising to:
    decode one or more code words specifying a number N of pictures, including both short-term and long-term pictures;
    decode one or more code words in a loop that is run N times by:
      decoding an indication of whether a picture is a long-term picture or not;
      derive an integer K[i] for each long-term picture i, wherein the integer K[i] is derived by two code words A[i] and B[i], wherein B[i] is signaled using a fixed length code word of size n, and A[i] is signaled using a variable length code;
    derive an indicator value V[i] for at least one long-term picture based on the value of the integer K[i] and a picture indicator value P of the current picture; and
    for each of the indicator values V[i], compare the indicator value V[i] with values associated with pictures stored in the DPB,
    keep the pictures stored in the DPB that are marked as short-term or long-term for which there is a match with one of the indicator values V[i] in the DPB as long-term pictures, and
    mark long-term pictures for which there is no match with any indicator value V[i] as unused for reference in the DPB.

15. The decoder of claim 14 wherein the operation to derive the indicator value V[i] for at least one of the long-term pictures comprises to subtract the value of the integer K[i] from the picture indicator value P.

16. The decoder of claim 14, the operations further comprising to:
  remove at least one picture from the DPB that was marked as unused for reference, wherein the removal comprises not reading a portion of the memory that was allocated to keep the picture marked as unused for reference, until a new picture has been decoded into the portion of the memory.

17. The decoder of claim 16, wherein the operation to remove a picture from the DPB that was marked as unused for reference comprises to:
  during decoding of a next picture following the current picture, not read the portion of the memory that was allocated to keep the picture marked as unused for reference.

18. The decoder of claim 14, wherein A[i] and B[i] are both positive integers >0 and B[i] is signaled as-is using the fixed length code word of size n, and K[i] is equal to A[i]*x+B[i]+k and x is equal to 2^n wherein ^ is the power operator, and k is a constant value equal to 0 or 1.

19. The decoder of claim 18, wherein an offset value decoded from the bitstream is added to A[i]*x+B[i] to derive K[i].

20. The decoder of claim 14, wherein A[i] is signaled using a Universal Variable Length Code, UVLC, code word.

21. The decoder of claim 14,
wherein the operation to decode one or more code words in the loop that is run N times, further comprises to decode an integer K[i]>0 for each short-term picture; and
the operations further comprise to perform for the short-term pictures:
  derive an indicator value V[i] for each short-term picture by subtracting the value K[i] from a picture indicator value P of the current picture;
  for each short-term picture indicator value V[i], compare the indicator value V[i] with values associated with pictures stored in a decoded picture buffer (DPB), wherein
  pictures in the DPB that are marked as short-term pictures for which there is a match with one short-term indicator value V[i] are kept in the DPB as short-term pictures and short-term pictures for which there is no match with any short-term or long-term indicator value V[i] are marked as unused for reference in the DPB.

22. The decoder of claim 14, the operations further comprise to:
  decode a code word indicating whether long-term pictures may be used for the current picture or not; and only when the code word that is decoded indicates that long-term pictures may be used, decode the indication whether the current picture is a long-term picture or not.

23. The decoder of claim 14, wherein a flag indicates whether one code word or a plurality of code words are to be used for decoding the integer K[i].

* * * * *